United States Patent Office 3,153,026
Patented Oct. 13, 1964

3,153,026
SUSPENSION POLYMERIZATION OF STYRENE USING PINACOLONE PEROXIDE AND SULFONATED POLYSTYRENE
Tevis Shusman, Longmeadow, and Earl C. Chapin, Springfield, Mass., assignors to Monsanto Company, a corporation of Delaware
No Drawing. Filed Nov. 23, 1960, Ser. No. 71,151
4 Claims. (Cl. 260—93.5)

This application is a continuation in part of our copending application S.N. 705,745, filed December 30, 1957, now abandoned.

The invention relates to the suspension polymerization of styrene. More particularly, it relates to an efficient process for polymerizing styrene in aqueous suspension to form a bead polymer which is substantially free of occluded suspending agent.

It is known that styrene can be polymerized in aqueous suspension to form a bead polymer. However, the known processes for preparing bead polystyrene have been characterized by one or more of the following disadvantages.
(1) Occlusion of suspending agent by the polymer,
(2) Insufficiently high conversion of monomer to polymer, and
(3) Co-formation of relatively large amounts of emulsion polymer.

One object of this invention is to provide a novel process for the suspension polymerization of styrene.

Another object is to provide a process for polymerizing styrene in aqueous suspension to form a bead polymer which is substantially free of occluded suspending agent.

A further object is to provide such a process in which there is a high conversion of monomer to polymer with a minimum formation of emulsion polymer.

These and other objects are attained by polymerizing styrene with agitation at 110–130° C. in an aqueous medium having a pH below 7 and containing 0.005–0.5% by weight of pinacolone peroxide as a catalyst and 0.02–1% by weight of a water-soluble alkali metal or ammonium salt of sulfonated polystyrene as a suspending agent, both percentages being based on the weight of styrene.

The following examples are given to illustrate the invention. Parts mentioned are parts by weight.

EXAMPLE I

A suspension polymer is prepared from the following polymerization recipe.

| Component: | Parts |
|---|---|
| Water | 100 |
| Styrene | 100 |
| Pinacolone peroxide | 0.3 |
| $NH_4SPS$ [1] | 0.1 |

[1] Ammonium salt of a sulfonated polystyrene containing one sulfonic group per styrene unit and having a pre-sulfonation Staudinger average molecular weight of 60,000.

A solution of the suspending agent in water is charged to a suitable reaction vessel, followed by the addition of a mixture of the styrene and catalyst. After the pH of the reaction mixture is adjusted to 4.3 by the addition of dilute HCl, the reaction vessel is purged with nitrogen, sealed, and heated with agitation at 120° C. for about 6 hours. The product, a bead polystyrene having an average bead size of 1–4 mm. in diameter, is washed with water. It has the following properties:

| Molecular weight (Staudinger) | 65,200. |
|---|---|
| Methanol solubles | 0.5%. |
| Residual monomer | None. |
| Emulsion polymer | 1.53%.[1] |
| Color | Water-white. |

[1] The amount of emulsion polymer formed is expressed in terms of the percent of monomer converted to emulsion polymer.

EXAMPLE II

Example I is repeated with the exception that 0.5 part of the sodium salt of a sulfonated polystyrene containing one sulfonic group per styrene unit and having a pre-sulfonation Staudinger average molecular weight of 60,000 is substituted for the 0.1 part of $NH_4SPS$. The product has the same properties as the product of Example I except that 4% of the monomer is converted to emulsion polymer.

EXAMPLE III

This example demonstrates the importance of controlling the pH of the reaction mixture in the practice of the invention.

Four suspension polymers are prepared from the following polymerization recipe.

| Component: | Parts |
|---|---|
| Water | 200 |
| Styrene | 100 |
| Pinacolone peroxide | 0.3 |
| NaSPS [1] | 0.1 |

[1] Sodium salt of a sulfonated polystyrene containing one sulfonic group per styrene unit and having a pre-sulfonation Staudinger average molecular weight of 60,000.

In each of the four reactions, a solution of the suspending agent in water is charged to a suitable reaction vessel, followed by the addition of a mixture of the styrene and catalyst. The pH of the reaction mixture is adjusted to the desired level by the addition of dilute HCl or $NH_4OH$, and the reaction vessel is then purged with nitrogen, sealed, and heated with agitation at 120° C. for about 6 hours.

The effect of the pH of the reaction mixture on the amount of emulsion polymer formed is shown below:

| pH: | Emulsion polymer, percent |
|---|---|
| 1.6 | 2.04 |
| 4.3 | 6.00 |
| 7.4 | 6.96 |
| 8.7 | 6.96 |

EXAMPLE IV

This example illustrates the criticality in choice of a suspending agent for minimizing formation of emulsion polymer.

Four suspension polymers are prepared by repeating Example I with the exception that the following polymerization recipe is employed.

| Component: | Parts |
|---|---|
| Water | 200 |
| Styrene | 100 |
| Pinacolone peroxide | 0.3 |
| Suspending agent (variable) | 0.5 |

The suspending agents used in each of the reactions, together with the amount of emulsion polymer formed in each reaction, are shown below. Each of the suspending agents is a salt of a sulfonated polystyrene containing one sulfonic group per styrene unit and having a pre-sulfonation Staudinger average molecular weight of 60,000.

| Suspending agent: | Emulsion polymer, percent |
|---|---|
| Trimethylamine salt | 16.2 |
| Diethanolamine salt | 18.0 |
| Triethanolamine salt | 18.6 |
| Butylamine salt | 31.4 |

These amounts of emulsion polymer obviously compare unfavorably with the amounts of emulsion polymer formed in Examples I–III. In preparing a suspension polymer, emulsion polymer formation should be kept at a minimum, preferably less than 7%.

EXAMPLE V

This example demonstrates the criticality in choice of a catalyst for obtaining high conversion of monomer to polymer.

Part A

Four suspension polymers are prepared by repeating Example I with the exception that the following polymerization recipe is employed.

| Component: | Parts |
|---|---|
| Water | 200 |
| Styrene | 100 |
| Catalyst (variable) | 0.3 |
| NH$_4$SPS [1] | 0.1 |

[1] Ammonium salt of a sulfonated polystyrene containing one sulfonic group per styrene unit and having a pre-sulfonation Staudinger average molecular weight of 60,000.

The catalysts used in each of the reactions are shown below, together with the Staudinger average molecular weights (M.W.) and the methanol solubles and residual monomer contents of the products.

| Catalyst | M.W. | Methanol Solubles, percent | Residual Monomer, percent |
|---|---|---|---|
| Pinacolone peroxide | 65,200 | 0.5 | none |
| t-Butyl peracetate | 49,100 | 0.6 | 0.36 |
| Di-t-butyl peroxide | 67,000 | 1.5 | 1.33 |
| Cumene hydroperoxide | 43,600 | 4.3 | 3.38 |

Part B

Four suspension polymers are prepared by repeating Part A with the exception that 0.2 part of catalyst is used instead of 0.3 part. The results are shown below.

| Catalyst | M.W. | Methanol Solubles, percent | Residual Monomer, percent |
|---|---|---|---|
| Pinacolone peroxide | 71,050 | 0.5 | 0.17 |
| t-Butyl peracetate | 54,200 | 1.6 | 1.28 |
| Di-t-butyl peroxide | 70,200 | 2.9 | 2.37 |
| Cumene hydroperoxide | 50,900 | 5.5 | 5.10 |

The invention is a process for preparing bead polystyrene by polymerizing styrene with agitation at 110–130° C. in an aqueous medium having a pH below 7 and containing 0.005–0.5% by weight of pinacolone peroxide as a catalyst and 0.02–1% by weight of a water-soluble alkali metal or ammonium salt of sulfonated polystyrene as a suspending agent, both percentages being based on the weight of styrene.

The suspending agents are known materials comprising the ammonium or alkali metal (i.e., sodium, potassium, etc.) salts of sulfonated polystyrenes containing 0.5–1.5 sulfonic groups per styrene unit and having pre-sulfonation Staudinger average molecular weights of 10,000–100,000, preferably 60,000–80,000. They may be prepared, e.g., by the processes disclosed in U.S. Patents 2,533,210 and 2,533,211. In the practice of the invention, it is found that the amount of emulsion polymer formed increases with an increase in the concentration of suspending agent, necessitating an upper limitation of 1% by weight of suspending agent, based on the weight of styrene. Preferably, the reaction mixture contains about 0.05–0.5 part of suspending agent per 100 parts of styrene.

The technique by which styrene is polymerized in the presence of pinacolone peroxide and a water-soluble sulfonated polystyrene salt in the practice of the invention is a typical aqueous suspension polymerization technique. Thus, the polymerization is conducted with agitation in an inert atmosphere under atmospheric or superatmospheric pressure, a pressure of about 25 p.s.i.g. having been utilized with particular success. The ratio of water to monomer in the reaction mixture is usually in the range of 0.9:1 to 10:1, preferably 0.9:1 to 2:1. The pH of the reaction mixture is maintained at a level below 7 to minimize formation of emulsion polymer.

Although the invention is particularly directed to the homopolymerization of styrene, it is also applicable to the copolymerization of styrene with up to 50% by weight, based on total monomer, of copolymerizable monomers, such as butadiene, acrylates, methacrylates, acrylonitrile, etc., and to the polymerization of styrene in the presence of preformed polymers, e.g., natural and synthetic rubbers. If desired, the polymerization can be conducted in the presence of conventional additives, such as stabilizers, lubricants, fillers, colorants, extenders, molecular weight regulators, etc.

The process of the invention leads to the formation of polystyrene having a bead size of 1–4 mm. in diameter. It is particularly advantageous in that it achieves high conversion of monomer to polymer with a minimum formation of emulsion polymer while forming a bead polymer which is substantially free of occluded suspending agent.

It is obvious that variations can be made in the processes set forth above without departing from the spirit and scope of this invention.

What is claimed is:

1. A process which comprises polymerizing 100 parts by weight of styrene with agitation at 110–130° C. in an aqueous medium having a pH below 7 and containing 0.005–0.5 part by weight of pinacolone peroxide as a catalyst and 0.02–1 part by weight of a suspending agent of the group consisting of the ammonium and alkali metal salts of sulfonated polystyrenes containing 0.5–1.5 sulfonic groups per styrene unit and having pre-sulfonation Staudinger average molecular weights in the range of 10,000–100,000.

2. A process as in claim 1 wherein the suspending agent is an ammonium salt.

3. A process as in claim 1 wherein the suspending agent is a sodium salt.

4. A process as in claim 1 wherein the suspending agent is a member of the group consisting of the ammonium and alkali metal salts of sulfonated polystyrenes containing one sulfonic group per styrene unit and having pre-sulfonation Staudinger average molecular weights in the range of 60,000–80,000.

References Cited in the file of this patent

UNITED STATES PATENTS

| 2,538,050 | Schick | Jan. 16, 1951 |
| 2,612,485 | Baer et al. | Sept. 30, 1952 |
| 2,622,077 | Park et al. | Dec. 16, 1952 |